June 1, 1943.  A. C. SCHROEDER  2,320,834
CONVEYER
Filed Feb. 13, 1941  2 Sheets-Sheet 2
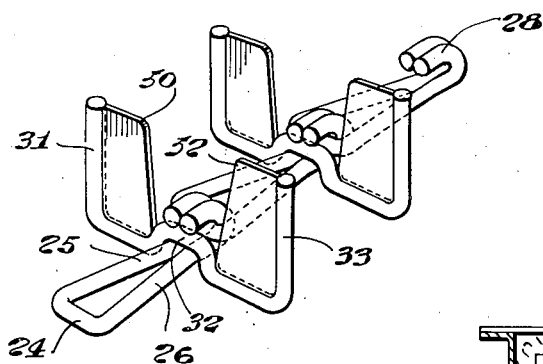
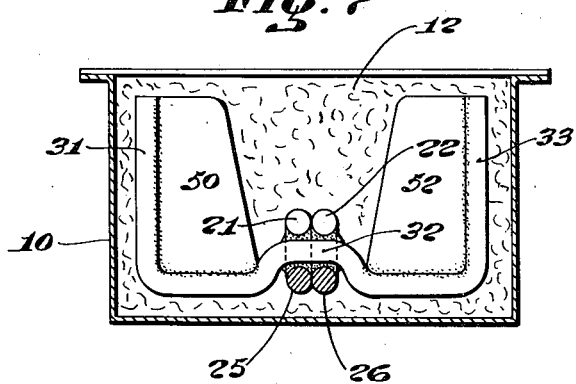
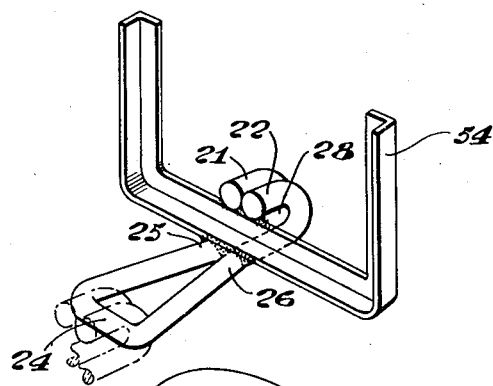
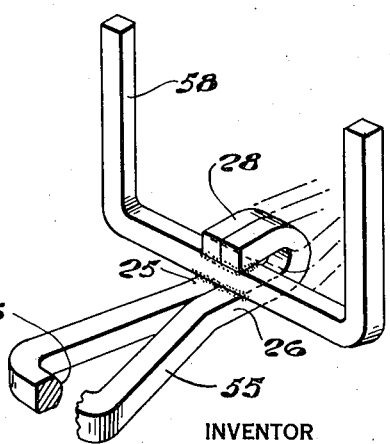
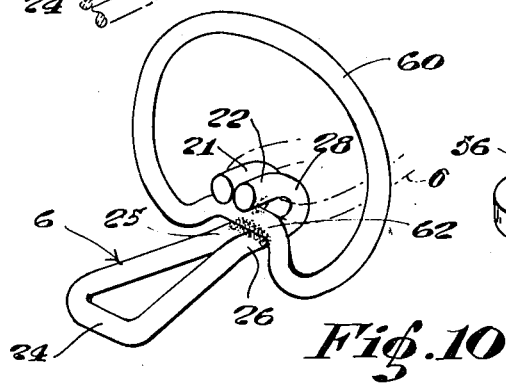
INVENTOR
Arthur C. Schroeder
BY J. Stanley Churchill
ATTORNEY Patented June 1, 1943

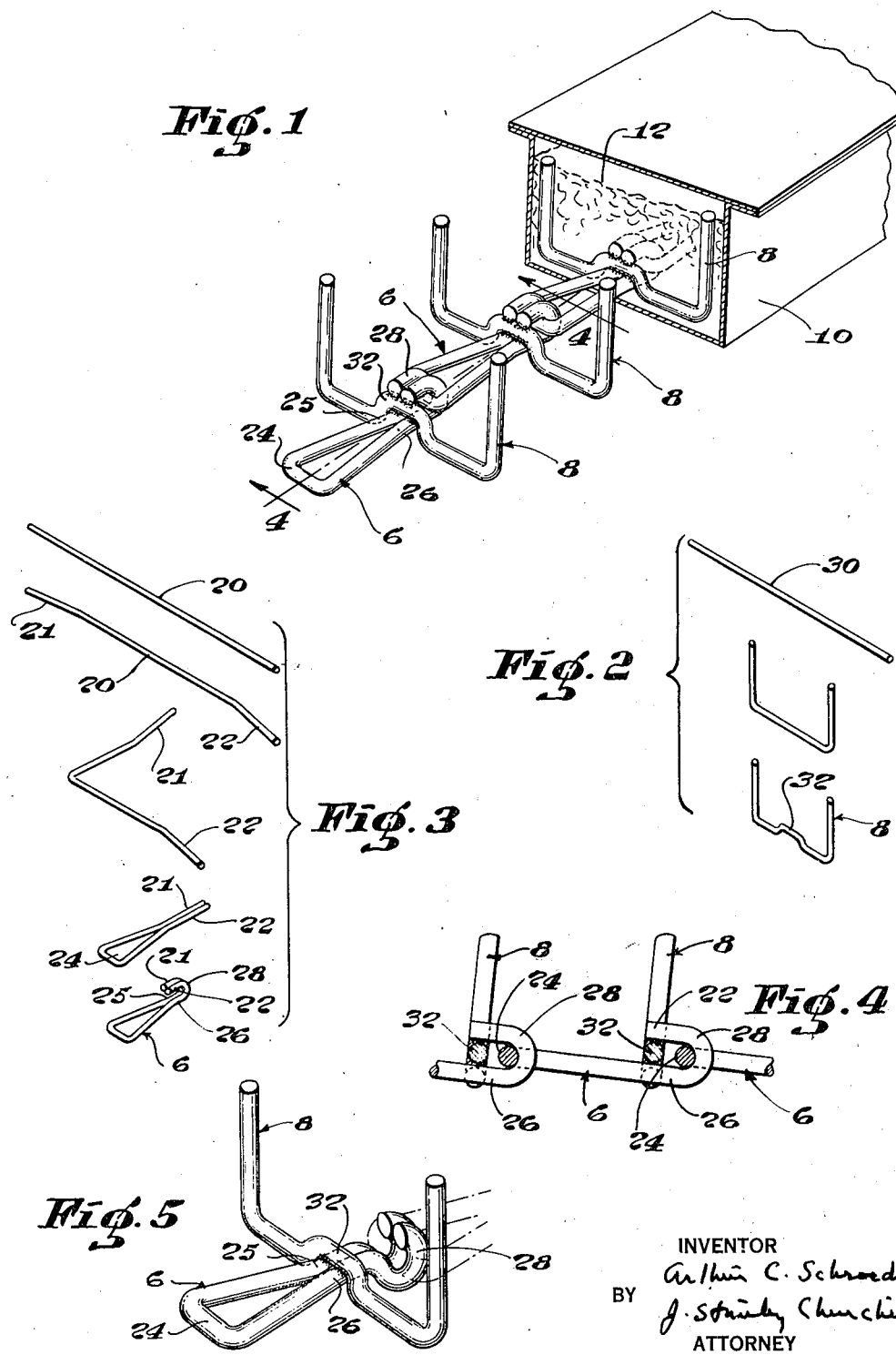

2,320,834

UNITED STATES PATENT OFFICE 2,320,834

CONVEYER

Arthur C. Schroeder, Syracuse, N. Y., assignor to Redler Conveyor Company, Quincy, Mass., a corporation of Massachusetts Application February 13, 1941, Serial No. 378,734

13 Claims. (Cl. 198—176)

This invention relates to a conveying element and to a method of making the same.

The invention has for an object to provide a novel conveying element having superior characteristics as to strength, economy and accuracy of manufacture, durability, and the construction of which lends itself to manufacture from a wide variety of metals and alloys, and particularly metals and alloys not readily cast, thus rendering the conveying element particularly suitable for use in conveyers for handling a wide range of materials.

A further object to the invention is to provide a novel, highly efficient and economical method by which the present conveying element may be produced.

With these general objects in view and such others as may hereinafter appear, the invention consists in the conveying element, in the method of making the same, and in the various structures, arrangements and combinations of parts hereinafter described and particularly defined in the claims at the end of this specification.

In the drawings illustrating different embodiments of the invention, and also illustrating steps in the preferred method of making the same, Fig. 1 is a perspective view of a portion of a conveyer provided with a conveying element embodying the present invention; Figs. 2 and 3 are diagrammatic views illustrating the successive steps preferably employed in the formation of the flight and tension element respectively of the present conveying element shown in Fig. 1; Fig. 4 is a longitudinal sectional view on the line 4—4 of Fig. 1 illustrating the method of attachment of the flights to the tension members; Fig. 5 is a perspective of a modified form of flight embodying the invention; Fig. 6 is a similar view of another modified form of flight; Fig. 7 is a cross sectional view of still another modification of the present conveyer flight; Figs. 8 and 9 are perspective views to be referred to; and Fig. 10 is a perspective view of still another modification of the present conveyer flight.

In general, the present invention contemplates a conveying element comprising a plurality of connected flights of novel structure and which may be made by a novel and highly efficient method. The conveying element in various forms is adapted for use in the conveyance of flowable solid material through a conduit or trough, and the individual flights making up the conveying element may comprise either open flights such, for example, as are embodied in a conveyer of the "Redler" type, or may comprise solid flights such, for example, as are at present embodied in various solid flight conveyers now upon the market.

In the present commercial forms of both open flight and solid flight conveyers. the individual flights have been of the cast iron or cast steel type and have been connected one to the other in various ways. Such flights possess certain limitations as to strength and under certain conditions of use present certain disadvantages because of wear and the tendency to contaminate the product being conveyed, and particularly food products, with small particles of the iron or steel and with sand which oftentimes adheres to the individual flights as a result of the casting operation. In contradistinction to such prior flights, the present invention contemplates individual flights made from bar stock die forged into the desired shape or section, and as a result of this procedure, it is possible to use standard bar stock of any required material such, for example, as steel, stainless steel, brass, bronze, phosphor bronze, Monel metal and any of the other corrosion resisting and durable alloys now upon the market. By constructing the component parts of the present flight of portions die forged into the desired shape, a conveying element may be produced possessing superior strength characteristics as compared with a corresponding conveying element produced with cast iron or cast steel links, and as a result, the safety and reliability of the conveying element so fabricated are greatly enhanced. The die forging operation lends itself to the economical production of the individual flights, and for a given strength of conveying element, a substantial reduction may be effected in the individual sectional dimension of the individual flights. As a result, particularly in the larger size of conveyers, an increased amount of material may be conveyed for a given size of conveyer and with a reduction in power consumed. In the larger sizes of conveyers, and particularly in long lengths of conveyers, this represents a substantial advance over the conveyers of the prior art. In addition, the present die forged type of flight lends itself to use in relatively small conveyers where difficulty has been heretofore experienced in producing a satisfactorily cast flight because of the small dimensions of the individual flights. Another advantage of the present type of conveyer flight resides in the fact that the bar stock lends itself to heat treatment by which the wearability and adaptability of the conveyer flight for handling hot materials at high temperatures are increased.

Referring now to the drawings, in Fig. 1 I have illustrated a conventional form of conveyer of the open flight type operating upon principles of the well-known "Redler" conveyer now upon the market. Such a conveyer includes a conduit or trough 10 through which flowable solid material 12 may be drawn in a continuous stream by a conveying element of the open flight type driven by driving sprockets (not shown) as is well-known. The conveying element illustrated in Fig. 1 is made up of a plurality of individual flight members and each flight member comprises two separate metal members die forged from a length of bar stock, one member 6 comprising a tension member and the other member 8 comprising a flight member of open shape. The tension member 6 may be formed in the manner diagrammatically illustrated in Fig. 3 by a series of die forging operations in which a length 20 of bar stock is first bent at its ends 21, 22 and then the central portion of the bar 20 is bent to form an open loop 24 and to cause the end portions 21, 22 to assume a contiguous position. The end portions 21, 22 are then bent into the form of an open hook 28. The individual open flight member 8 is die forged into general U-shape from a bar 30 and is preferably provided with a recessed or offset portion 32 adapted to permit the flight to straddle portions 25, 26 of the tension element. The flight, after it has been die forged into the shape illustrated in Fig. 2, is assembled in the manner illustrated in Fig. 1 so that the recessed portion 32 of the flight is disposed transversely of the tension element and with the recessed portion 32 extending under the ends 21, 22 of the hook 28 in a position to permit the ends of the hook to be welded thereto and in a position to permit the under surface of the portion 32 to be welded to the portions 25, 26 of the tension element. It will be understood that in the structure illustrated in Fig. 1, the tension element of one flight will be connected to the tension element of a succeeding flight with the looped portion disposed within the hook of the succeeding flight in the manner illustrated in Fig. 1.

For some purposes, it may be desirable to provide a structure in which the tension element of one flight is detachably connected to the tension element of adjacent flights and as illustrated in Fig. 5, such a modification may comprise a tension element in which the hook 28 is formed as illustrated to enable the loop of an adjacent flight to be detachably hooked therein and in which the flight member is assembled and welded to the central portion of the tension element with the portion 32 of the flight straddling and welded to the individual portions 25, 26 of the tension element.

In Figs. 6 and 7, I have illustrated a conveying element embodying the invention and of the semi-solid flight type wherein metal plates 50, 52 shaped to conform to the flight members of the conveying element illustrated in Fig. 1, are welded or braced to the uprights 31, 33 of the flights and to the transversely extended portions of the flight. The plates are preferably of such size as to provide a central opening between them corresponding to the central recessed portion 32 of the flight so as to permit the semi-solid flight thus produced to operate efficiently in the conveyance of materials of certain characteristics and for which semi-solid flight types of conveyer have been found to be particularly useful. In the operation of a conveyer embodying a conveying element of the type illustrated in Figs. 6 and 7, the tension element may be made to float in the load a short distance above the bottom of the casing in substantially the manner in which open flight conveyers operate, reducing to a minimum the power required for the operation of the conveyer and facilitating the discharge of the material from between the flights.

The construction of the conveying element is such that it may be produced of a wide variety of materials including those difficult to cast and as a result, the special requirements at times experienced when conveying certain materials, may be complied with, such for example, as resistance to corrosion, exceedingly high temperature conditions and heavy loads requiring exceptional strengh. The conveyer has the further advantage that the joints between the links are open, minimizing the liability of clogging of the same by the material being conveyed.

In Figs. 8 and 9, I have illustrated another modification of a conveying element embodying the invention. In Fig. 8 the structure of the tension element is the same as that of the tension element 6 of the conveying element shown in Fig. 1 and the open flight is illustrated as comprising a structural metal bar illustrated as an angle bar 54 bent into U-shape and welded to the end of the hook 28 and to the portions 25 and 26 of the tension element. In Fig. 9 the tension element is of the general shape and formed in the manner illustrated in Figs. 1 and 3 but may comprise a bar stock 55 of general rectangular section. It is preferred that the inner face of the bar be rounded as illustrated at 56 in Fig. 9 in order to provide a most suitable turning surface for cooperation with the inner face of the hook 28. The flight is illustrated as comprising a bar of rectangular section 58 welded to the ends of the hook and to the portions 25 and 26 of the tension member as shown. The structures illustrated in Figs. 8 and 9 are such as may be produced at minimum expense, of standard materials, and the conveying element produced possesses all of the advantages pointed out with respect to the conveying element illustrated in Fig. 1.

In Fig. 10 I have illustrated an embodiment of the invention particularly adapted for use in a cylindrical casing. As therein shown, the tension member 6 may be of the same structure as that illustrated in Fig. 1. The open flight member 60 is illustrated as having spaced upright portions connected to form a substantially circular flight provided with a recessed or offset portion 62 arranged to extend under the ends 21, 22 of the hook 28 and to be welded between such ends and the portions 25, 26 of the tension element.

It will be understood that in practice various combinations of different conveyer flights may be used in a conveyer to produce a conveying element comprising a series of flights adapted for the particular purpose desired. For example, a conveying element made up of a series of conveyer flights as illustrated in Fig. 1 may be provided with one or more detachable flights of the type shown in Fig. 5 in order to facilitate assembly of the conveying element in the casing. Furthermore, such a conveying element may be provided with one or more closed or semi-closed flights, as shown in Fig. 6 to serve as clean-out flights when it is desired to entirely empty the conveyer at the end of a particular run.

As used throughout the claims hereof, the term "welded" is intended to include the operation of brazing and other equivalent methods of attachment of the flights to the tension members.

While the different features of the invention have been herein illustrated and described as embodied in various forms of the invention, it will be understood that the invention may be embodied in other forms within the scope of the following claims.

Having thus described the invention, what is claimed is:

1. A conveyer flight adapted for connection to other flights to form a conveying element, comprising two separate metal members each formed of a length of bar stock, one member comprising a tension member bent to provide connecting means at each of its ends, one of said connecting means being in the form of a hook, and the second member comprising a flight member of open shape having a base portion and spaced upright portions, said flight member being disposed transversely of the tension member with the base portion thereof welded to the end of said hook to form a unitary structure.

2. A conveyer flight adapted for connection to other flights to form a conveying element, comprising two separate metal members each formed of a length of bar stock, one member comprising a tension member bent to provide connecting means at each of its ends, and the second member comprising a U-shaped flight member having a base portion with an offset therein and spaced upright portions integral with the base and forming a flight open at its top, said flight member being disposed transversely of the tension member and having the latter disposed within said offset portion and with the base portion thereof welded thereto at said offset portion, to form a unitary structure.

3. A conveyer flight adapted for connection to other flights to form a conveying element, comprising two separate metal members each formed of a length of bar stock, one member comprising a tension member bent to form a loop at one end thereof, and a hooked portion at the other end, said hooked portion being adapted to hook over the loop end of an adjacent flight, said flight member being disposed transversely of the tension member with the base portion thereof welded thereto and to the end of said hooked portion to form a unitary structure.

4. In a conveyer, a pair of adjacent flight members, each flight member comprising two separate metal members formed of bar stock, one member comprising a tension member bent to form a loop at one end and a hooked portion at the other end, the second member of each flight comprising a flight member of open shape having a base portion and spaced upright portions, said flight member being disposed transversely of the tension member in a position to form a closure for said hooked portion and being welded to said tension member, the loop portion of the next adjacent flight being disposed within said hooked portion of the first flight member to connect the two together.

5. In a conveyer, a pair of adjacent flight members, each flight member comprising two separate metal members formed of bar stock, one member comprising a tension member bent to form a loop at one end and a hooked portion at the other end, the second member of each flight comprising a flight member of open shape having a base portion and spaced upright portions, said flight member being welded on two opposed sides thereof to the ends of said hooked portion and to the body of the tension member respectively, the loop portion of the next adjacent flight being disposed within said hooked portion of the first flight.

6. A conveyer flight as defined in claim 2, in which a plate is secured to the U-shaped flight member between the offset portion and the spaced uprights.

7. A conveyer element comprising, two separate metal members each formed of a length of bar stock, one of said members constituting a tension member having a body provided with means at the opposite ends thereof for connection to adjacent flights, and the other of said members being shaped to provide an open flight member including an offset portion straddling the body of said tension member and to serve as means for positioning said flight member transversely relative to the body of said tension member, said offset portion being welded to said tension member.

8. A conveyer element comprising, two separate metal members each formed of a length of bar stock, one of said members constituting a tension member having a body shaped to provide a loop at one end thereof and a hook at the opposite end thereof, and the other of said members being shaped to provide an open flight member including an offset portion adapted to straddle the body of said tension member and to serve as means for positioning said flight member transversely relative to the body of said tension member, said offset portion being disposed at the open end of said hook and being welded to said body and hook.

9. A conveyer element comprising, a flight member made of angle iron shaped to provide a base portion and spaced upright portions, and a tension member formed of a length of bar stock and having a loop at one end thereof and a hook at the opposite end thereof, said flight member being disposed transversely of the tension member and welded at its base to the end portion of said hook.

10. A conveyer element comprising, a flight member made of angle iron shaped to provide a base portion and spaced upright portions, one flange of said angle iron extending inwardly with respect to said base and upright portions, and a tension member having a hook formed at one end thereof, said flight member extending transversely of said tension member and having the inwardly extending flange of said base portion welded to said hook.

11. A conveyer element comprising, a flight member made of angle iron shaped to provide a base portion and spaced upright portions, one flange of said angle iron extending inwardly with respect to said base and upright portions, and a tension member including a body having a hook formed at one end thereof, said flight member extending transversely of said tension member and being welded to the body of said tension member at a point substantially medially of the base portion of said flight member and having the inwardly extending flange of said base portion welded to said hook.

12. A conveyer element comprising, a flight member made of angle iron shaped to provide a base portion and spaced upright portions, one flange of said angle iron extending inwardly with respect to said base and upright portions, and a tension member including a body having a hook formed at one end thereof, said flight member extending transversely of said tension member and being welded to the body of said tension member at a point substantially medially of the base portion of said flight member and having the upper edge of the inwardly extending flange of said base portion welded to said hook.

13. A conveyer element comprising, two separate metal members each formed of a length of bar stock, one of said members constituting a tension member having a body shaped to provide a loop at one end thereof and a hook at the opposite end thereof, and the other of said members constituting a flight member and being formed of stock substantially rectangular in cross section and shaped to provide an open flight including a base portion and spaced upright portions, the end of said hook being spaced from the body of said tension member a distance substantially equal to the upright dimension of the base portion of said flight member, whereby when said flight member is inserted in the open end of said hook, relative turning of said flight member with respect to the body of said tension member is prevented, and means securing said flight member and tension member together in the relation specified.

ARTHUR C. SCHROEDER.